(12) United States Patent
Russell et al.

(10) Patent No.: US 11,625,712 B2
(45) Date of Patent: Apr. 11, 2023

(54) SYSTEMS AND METHODS FOR EXECUTING ELECTRONIC TRANSACTIONS AND TOKENIZATIONS WITH DISTRIBUTED SETTLEMENT PLATFORM

(71) Applicant: Worldpay, LLC, Symmes Township, OH (US)

(72) Inventors: Danny K. Russell, London (GB); Thomas Helldorff, London (GB)

(73) Assignee: Worldpay, LLC, Symmes Township, OH (US)

( * ) Notice: Subject to any disclaimer, the term of this patent is extended or adjusted under 35 U.S.C. 154(b) by 131 days.

(21) Appl. No.: 17/172,501

(22) Filed: Feb. 10, 2021

(65) Prior Publication Data
US 2022/0253836 A1    Aug. 11, 2022

(51) Int. Cl.
*G06Q 20/38* (2012.01)
*G06Q 20/06* (2012.01)
*G06Q 20/40* (2012.01)

(52) U.S. Cl.
CPC .......... *G06Q 20/381* (2013.01); *G06Q 20/06* (2013.01); *G06Q 20/38215* (2013.01); *G06Q 20/401* (2013.01)

(58) Field of Classification Search
None
See application file for complete search history.

(56) References Cited

U.S. PATENT DOCUMENTS

| | | | |
|---|---|---|---|
| 2019/0109709 A1 | 4/2019 | Wu | |
| 2019/0197548 A1* | 6/2019 | Kelly-Frank | G06Q 20/367 |
| 2021/0133735 A1* | 5/2021 | Maim | G06Q 20/06 |
| 2021/0241243 A1* | 8/2021 | Wiklof | G06Q 20/38215 |
| 2021/0398211 A1* | 12/2021 | Maathur | G06Q 20/381 |
| 2022/0156727 A1* | 5/2022 | Yan | G06Q 10/06315 |

FOREIGN PATENT DOCUMENTS

| | | |
|---|---|---|
| CN | 111612595 A | 9/2020 |
| EP | 2400453 A1 | 12/2011 |

OTHER PUBLICATIONS

International Search Report and Written Opinion in PCT Application No. PCT/US2021/060205 dated Mar. 2, 2022, (32 pages).
Lykke, "IATA Digital Coin," Web page <https://youtu.be/KipuUa6h6o>, Sep. 2016.

\* cited by examiner

*Primary Examiner* — Neha Patel
*Assistant Examiner* — Nicholas K Phan
(74) *Attorney, Agent, or Firm* — Bookoff McAndrews, PLLC

(57) ABSTRACT

Systems and methods for executing a distributed electronic transaction by a processing system are disclosed. One method includes receiving, by the processing system, a first transaction request from a first merchant system. The first transaction request may include a first exchange request and/or a distributed settlement agreement. The processing system may generate one or more tokens based on the first exchange request. The processing system may store a transaction amount based on the first exchange request in an exchange database. The processing system may transmit the one or more tokens to the first merchant system. The processing system may transmit one or more tokens based on the payment request to one or more second merchant systems.

20 Claims, 7 Drawing Sheets

SYSTEMS AND METHODS FOR EXECUTING ELECTRONIC TRANSACTIONS AND TOKENIZATIONS WITH DISTRIBUTED SETTLEMENT PLATFORM

TECHNICAL FIELD

The present disclosure relates generally to the field of electronic transactions and, more particularly, to systems and methods for executing electronic transactions with a distributed settlement platform.

BACKGROUND

Merchants can perform e-commerce and electronic fund transactions domestically and internationally. Such transactions allow businesses and consumers to conveniently transfer money and/or make purchases for items and/or services to and from different countries around the world. In some business industries, however, a single e-commerce transaction involves multiple entities, channels and/or countries to complete the transaction. For example, when a product or (a service) is purchased from a merchant website, the money paid for the product may be required to go through multiple entities, channels, and/or countries to reach its final destination. Thus, such e-commerce transaction often experiences long duration, excess fees, and/or security risks in order to complete a single transaction. The present disclosure is directed to addressing these and other drawbacks to existing e-commerce and/or electronic fund transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method for executing a distributed electronic transaction by a processing system, comprising: receiving, by the processing system, a first transaction request from a first merchant system, the transaction request including a first exchange request and/or a distributed settlement agreement; generating, by the processing system, one or more tokens based on the first exchange request; storing, by the processing system, a transaction amount based on the first exchange request in an exchange database; transmitting, by the processing system, the one or more tokens to the first merchant system; and transmitting, by the processing system, one or more tokens based on the first transaction request to one or more second merchant systems.

One embodiment provides a system comprising: one or more computer readable media storing instructions for executing a distributed electronic transaction; and one or more processors configured to execute the instructions to perform operations comprising: receiving, by a processing system, a first transaction request from a first merchant system, the transaction request including a first exchange request and/or a distributed settlement agreement; generating, by the processing system, one or more tokens based on the first exchange request; storing, by the processing system, a transaction amount based on the first exchange request in an exchange database; transmitting, by the processing system, the one or more tokens to the first merchant system; and transmitting, by the processing system, one or more tokens based on the first transaction request to one or more second merchant systems.

One embodiment provides a non-transitory computer-readable medium storing instructions for executing a distributed electronic transaction, the instructions, when executed by one or more processors, causing the one or more processors to perform operations comprising: receiving, by a processing system, a first transaction request from a first merchant system, the transaction request including a first exchange request and/or a distributed settlement agreement; generating, by the processing system, one or more tokens based on the first exchange request; storing, by the processing system, a transaction amount based on the first exchange request in an exchange database; transmitting, by the processing system, the one or more tokens to the first merchant system; and transmitting, by the processing system, one or more tokens based on the first transaction request to one or more second merchant systems.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
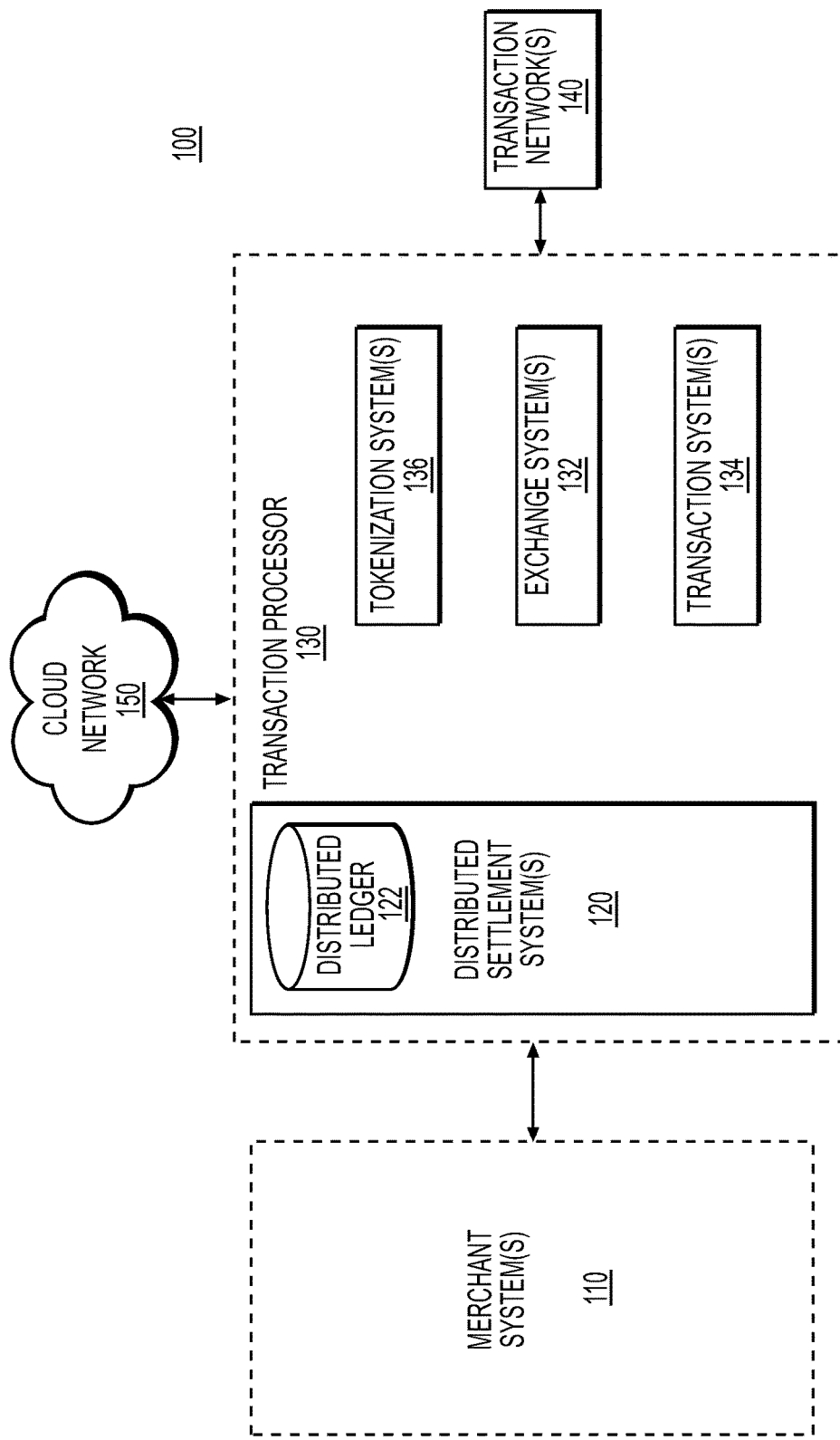
FIG. 1 depicts a block diagram of an exemplary electronic transaction system, according to one aspect of the present disclosure.

The following embodiments describe systems and methods for facilitating electronic transactions. More particularly, the embodiments contemplated in the present disclosure may enable merchants, customers, businesses, institutions, etc. to utilize a transaction processor that communicates with a distributed settlement platform (or system) to facilitate various electronic transactions. Additionally or alternatively, the embodiments of the present disclosure may enable merchants, customers, businesses, institutions, etc. to communicate directly with a distributed settlement platform supported by one or more transaction processors to facilitate various electronic transactions. The transaction processor may be configured to execute electronic fund transfer and/or exchange transactions, tokenization, and/or electronic transaction authorizations by communicating with merchant systems and distributed settlement systems.

As discussed above, in some business industries (e.g., airline industry), a single e-commerce transaction (e.g., a flight ticket purchase) may require multiple entities, channels, and/or countries to complete the transaction. For example, when an airline ticket is purchased from a merchant website in one country for flying to another country, the money paid for the airline ticket may have to go through multiple entities (e.g., airlines, airports, vendors, etc.), channels (e.g., payment schemes), and/or countries to reach its final destination. In some cases, as the money travels through various entities, channels, and/or countries, a significantly amount of time, as well as various required fees (e.g., payment scheme fees, currency exchange fees, etc.), may be expended. Further, due to the prolonged transaction duration, elevated risk of fraud, security exposure, and/or potential loss of funds may be occur.

To address the above-noted problems, the present disclosure describes systems and methods that expeditiously and securely execute electronic transactions between multiple entities. For example, a transaction processor including an exchange system, a transaction system, and a tokenization system of the present disclosure may communicate with a distributed settlement system to execute electronic fund transfer and/or token exchange transactions. In one embodiment, the transaction processor may receive, via a distributed settlement system, an exchange request from a merchant system to exchange a currency into one or more tokens. The transaction processor may then generate, via the tokenization system, one or more tokens based on the exchange request. In one embodiment, the exchange system may store the transaction amount associated with the exchange request in an exchange database. The exchange system may then transmit or issue, via the distributed settlement system, the one or more tokens to the merchant system. The merchant system may then utilize the received tokens to make payments or transfer funds to other entities (e.g., merchant systems). In one embodiment, any and all transactions performed between the merchant system and the transaction processor may be recorded or stored in the distributed settlement system. The distributed settlement system may comprise a public blockchain, a private blockchain, or a point-to-point distributed (or shared) ledger.

It should be appreciated that particular consideration is made herein to purchase transactions relating to merchants or sub-merchants. Despite this reference to purchase and exchange transactions relating to merchants, certain disclosed systems and methods may apply equally well to various other e-commerce transactions. Effectively, any circumstance where credit, currency, crypto currency, collateralized funds, smart contracts, and/or tokenized funds thereto, is being transmitted over a network, systems and methods disclosed herein may be employed. Further, while the party seeking to initiate a secure transaction and/or provide a third-party service may be referred to herein as a "merchant," a party seeking to initiate a secure transaction need not be a merchant, but may be a service provider, or any party seeking to execute a transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a merchant system(s) 110 and a transaction processor 130, which is in communication with a transaction network(s) 140. In one embodiment, the transaction processor 130 may include a distributed settlement system(s) 120, an exchange system(s) 132, a transaction system(s) 134, and a tokenization system(s) 136. The merchant (or sub-merchant) system(s) 110 may include one more merchant systems that may transmit, for example, a request to: 1) exchange currency funds (e.g., fiat currency or any other form of currency) into one or more tokens (e.g., tokenized funds); 2) exchange funds from one currency (e.g., U.S. dollar (USD), European Euro (EUR), Korean Won (KRW), Singapore Dollar (SGD), etc.) to another currency; 3) make payments or transfer funds to other merchant systems with currency funds and/or tokens currency; and/or 4) bankout funds and/or tokens associated with one or more accounts of the merchant system(s) 110. In one embodiment, the merchant system(s) 110 may communicate with the distributed settlement system(s) 120 to facilitate the electronic transactions of the present disclosure. The distributed settlement system(s) 120 may record or store electronic transaction information (or history) and/or one or more agreements (e.g., settlement agreement, purchase agreement, service agreement, etc.) between multiple parties (e.g., merchant system(s) 110, etc.). In some embodiments, the merchant system(s) 110 may communicate directly with the transaction processor 130 to facilitate the electronic transactions of the present disclosure.

In one embodiment, the distributed settlement system(s) 120 may include a distributed (or shared) ledger 122, which may comprise a secure public, semi-public, or private ledger. In one embodiment, the distributed ledger 122 may comprise a point-to-point distributed (or shared) ledger for storing information about one or more electronic transactions between the merchants that may be affiliated with the transaction processor 130. In the distributed shared ledger 122 information about a sequence of transactions may be stored in a public, semi-public, private, or point-to-point database, or "chain," of transactions. Each transaction may be represented in a "block" of information that includes information about a transaction. For financial transactions, such as for bitcoin cryptocurrency, collateralized funds, or tokenized funds, this information may include the parties to the transaction and the transaction amount. However, other interactions (e.g., smart contracts) may also be represented as transactions in the distributed ledger 122. For example, in one or more embodiments of the present disclosure, information about merchant system(s) 110, transaction processor 130, onboarding decisions and third party checks, etc., may be represented as a "transaction" in the distributed ledger 122.

One feature of a distributed (or shared) ledger is that the transactions may be verified and then stored in a block that is given a timestamp and a unique identifier or "hash." The combination of the verification and the unique hash for a block ensures that falsified transactions cannot be entered into the distributed ledger, and the recorded transactions are immutable. That is, a transaction, once recorded, cannot be deleted or altered without detection. The sequence of transactions, likewise, cannot be altered without detection.

A distributed (or shared) ledger may be distributed in a peer-to-peer network, such that identical copies of the distributed ledger are stored on the computing resources of multiple peers in the network. Thus, any attempt to alter a block on one peer may be easily detected by comparison with unaltered copies of the shared ledger on other peers. In some embodiments, computing resources and electronic storage present in the merchant system(s) 110, the distributed settlement system(s) 120, and the transaction processor 130, etc., may operate as peers in the peer-to-peer network supporting a distributed) ledger, with each peer possibly storing a separate copy of the distributed ledger.

Verification of a transaction may be by a "proof of work" scheme or a "proof of stake" scheme. In a "proof of work" scheme, verification requires performing an expensive computer calculation, such that the cost of verification is greater than a malicious party would want expend to create a falsified transaction, thus ensuring that verification can be trusted. In a "proof of stake" scheme, a verifier submits financial (or other) resources that would be forfeited in the event of a falsified transaction. The financial stake is greater than what a malicious party would want to risk in order to create a falsified transaction, thus ensuring that verification can be trusted. Verification may be provided by peers distributed across the network, thus eliminating a single point of failure or attack. In one embodiment, when the distributed settlement system(s) 120 detects a falsified transaction, the distributed settlement system(s) 120 may disable the party involved in the falsified transaction from creating new contracts or transferring and/or receiving funds. The distributed settlement system(s) 120 may also suspend the party's account to prevent any bankouts, revoke any certificates, and/or shutdown the account.

In one embodiment, the distributed settlement system(s) 120 may utilize a validity and uniqueness consensus service provided by a partner blockchain or distributed ledger company (e.g., R3) in order to determine whether transactions are contractually valid and unique amongst parties involved in the transaction. For example, the chain of payments may be verified when tokens are redeemed with the exchange system(s) 132. Further, when a fraudulent activity is identified, the transaction processor 130 may: 1) revoke the party's certificate which is used to sign transactions, which would make the party's node read only; and/or 2) revoke the party's Billing State, which is a state issued by the exchange system(s) 132 and used to track and meter what payments and contracts are created by a party. Without this functionality the parties will be able to receive funds and contracts but not make any new ones. Additionally, for guaranteeing uniqueness, a notary node may be supplied by a ledger provider which checks the hashes of states to ensure the transactions have not been made before.

Blockchains, in general, may be public, in which any entity with the necessary credentials may join the blockchain and view and send transaction, or they may be private, in which all participants are known to each other and access to transactions is tightly controlled. The distributed ledger 122 may use either of these approaches. Preferably, in one embodiment, a point-to-point distributed (or shared) ledger approach may be used. In a point-to-point distributed (or shared) ledger, participation in the distributed (or shared) ledger is controlled, transactions between participants may remain anonymous to other participants, and access to transactions may be controlled by permissions. In addition, the other participants not involved may not receive the transactions at all. Thus, a point-to-point distributed (or shared) ledger may combine the best capabilities of public and private blockchains and may make it easier for organizations to adopt distributed (or shared) ledger in applications, such as payment processing, which may be very sensitive to exposure of data in a public ledger. In addition, point-to-point distributed (or shared) ledger may provide advantages in processing speed and data security.

In addition to information stored in the distributed ledger 122, information about the merchant system(s) 110, the distributed settlement system(s) 120, and the transaction processor 130, and a hierarchical relationship between them, may be stored in a partner database outside of the distributed ledger 122. The partner database may be a relational database, such as a Structured Query Language (SQL) database, or may be a non-relational database, such as a Non SQL (NoSQL) database. Use of such a database external to the distributed ledger 122 may allow editing or updating the partner hierarchy, such as when the merchant system(s) 110 are added or removed. In some embodiments, the database external to distributed ledger 122 may be provided in a cloud network 150. Further, a partner blockchain companies (e.g., R3) may assist in overseeing smart contract transactions in the distributed ledger 122.

Still referring to FIG. 1, the transaction processor 130 may comprise the distributed settlement system(s) 120, the exchange system(s) 132, the transaction system(s) 134, and the tokenization system(s) 136. Further, the transaction processor 130 may include a plurality of other systems, including a server for receiving and storing the data associated with transactions. In one embodiment, the transaction processor 130 may communicate with the distributed settlement system(s) 120, the exchange system(s) 132, the transaction system(s) 134, and the tokenization system(s) 136, to execute the electronic transactions of the present disclosure. For example, the transaction processor 130 may receive electronic transaction requests from the merchant system(s) 110, via the distributed settlement system(s) 120, to facilitate, for example, 1) exchange of currency funds (e.g., fiat currency or any other form of currency) into one or more tokens (e.g., tokenized funds); 2) exchange of funds from one currency (e.g., U.S. dollar (USD), European Euro (EUR), Korean Won (KRW), Singapore Dollar (SGD), etc.) to another currency; 3) payments or transfer of funds to other merchant systems with currency funds and/or tokens currency; and/or 4) bankout of funds and/or tokens associated with one or more accounts of the merchant system(s) 110.

In one embodiment, when the merchant system(s) 110 transmits an authorization request for completing an electronic fund transaction (e.g., payment requests, bankout currency funds or tokens, etc.), the transaction processor 130 may act, via the distributed settlement system(s) 120, the exchange system(s) 132, the transaction system(s) 134, and the tokenization system(s) 136, as an intermediary for the merchant system(s) 110. That is, the transaction processor 130 may transmit the authorization request to the transaction network(s) 140 to complete the electronic fund transaction. The transaction processor 130 may also receive an authorization response with a result of the authorization request from the transaction network(s) 140, and may transmit the authorization response to the merchant system(s) 110. The transaction network(s) 140 may include payment networks, issuer systems, and/or acquirer systems facilitate the authorization or approval of various electronic transaction request (e.g., e-commerce transactions). In one embodiment, the exchange system(s) 132 may communicate with the merchant system(s) 110, via the distributed settlement system(s) 120, to facilitate electronic fund transactions requested by the merchant system(s) 110. Further, the distributed settlement system(s) 120 may store account information (e.g., electronic fund balance) associated with the merchant system(s) 110. The exchange system(s) 132 may also communicate with the tokenization system(s) 136 to execute electronic fund transactions as requested by the merchant system(s) 110. In one embodiment, the exchange system(s) 132 may transmit the electronic fund information (e.g., currency information, electronic funds, merchant payment tokens, etc.) to the tokenization system(s) 136. Additionally or alternatively, the exchange system(s) 132 and the tokenization system(s) 136 may be a single unitary system. The tokenization system(s) 136 may tokenize the electronic funds received from the transaction system(s) 134 to generate tokenized funds. In some embodiments, the tokenization system(s) 136 may generate tokenized funds and/or generate tokens for authenticating and authorizing payment transactions requested by the merchant system(s) 110. A token may be a low-value token or a high-value token. Further, a token may be a randomly generated number. In other embodiments, a token may be a pseudorandom number, encrypted information, or other character sequence. The exchange system(s) 132 may securely return a transaction response to the merchant system(s) 110, along with the tokenized funds and/or tokens generated by the tokenization system(s) 136.

Figure 2:
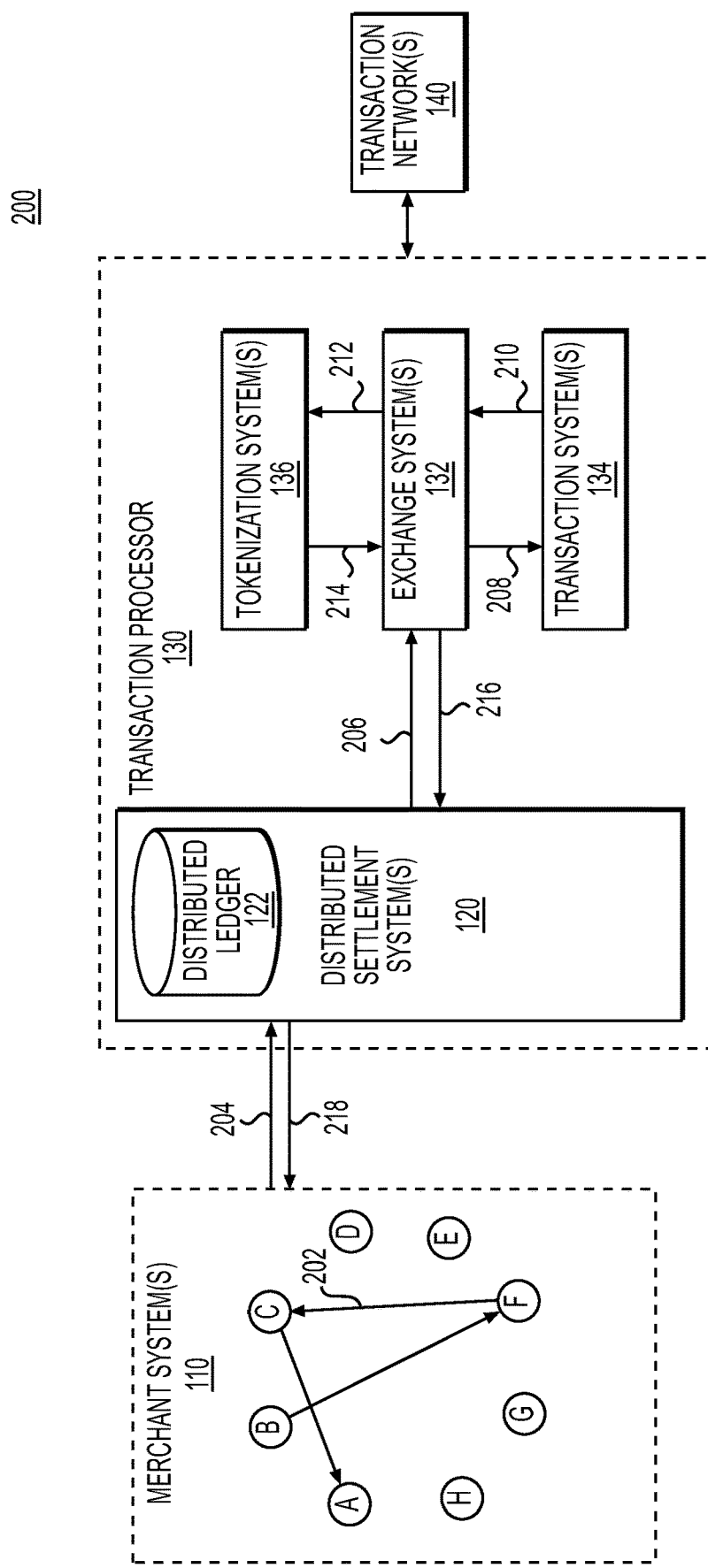
FIG. 2 depicts a block diagram of another exemplary electronic transaction system, according to one aspect of the present disclosure.

FIG. 2 shows a block diagram of an exemplary system 200 showing an exemplary transaction flow of the present disclosure. In one embodiment, the merchant system(s) 110 may include a plurality of Merchants or Sub-merchants A-H that may communicate with each other in order to facilitate electronic transactions of the present disclosure. Merchants A-H may be participants of the distributed ledger 122. As described above, the distributed ledger 122 may be a public, semi-public, or private blockchain. Additionally or alternatively, a point-to-point distributed ledger (or shared) may be used instead of a blockchain. In a point-to-point shared or distributed ledger, the participation in the distributed ledger may be controlled. That is, the transactions between merchants in communication with each other may remain anonymous to other merchants, and access to transactions may be controlled by permissions. Thus, the distributed ledger 122 may make it easier for merchant system(s) 110 and the transaction processor 130 to adopt the distributed ledger 122 in the electronic transaction of the present disclosure and may provide advantages in processing speed and data security.

In one embodiment, at step 202, Merchant F may transmit a transaction request to Merchant C (e.g., make purchases, send funds, exchange funds for tokens, etc.), via the distributed ledger 122. Transactions between Merchants C and F may remain anonymous to other merchants (e.g., Merchants A, B, D, E, H, and G). That is, only Merchants C and F may see or have access to the transaction request. Thus, the transaction request sent by Merchant F may support commercially sensitive transaction and no consensus of other participants may be required, resulting in a faster and efficient transaction. At step 204, the distributed settlement system(s) 120 may receive the transaction request from Merchant F and store or record the transaction request data in the distributed ledger 122. At step 206, the distributed settlement system(s) 120 may then verify the account information associated with Merchants F and C and transmit the transaction request to the exchange system(s) 132. In one or more embodiments, the exchange system(s) 132 may check, for example, whether the balances of currency for the transaction request is accurate, and may then update the account information associated with the transaction request. Further, the exchange system(s) 132 may communicate with the tokenization system(s) 134 to create and/or destroy tokens in accordance with the transaction request and may send them back to the merchant system(s) 110. At step 208, the exchange system(s) 132 may transmit the transaction request to the transaction system(s) 134. The transaction system(s) 134 may then communicate, if necessary, with the transaction network(s) 140 to complete the transaction request. At step 210, the transaction system(s) 134 may transmit a transaction confirmation message to the exchange system(s) 132. In one embodiment, the exchange system(s) 132 may perform the functions of the transaction system(s) 134 of the present disclosure. That is, the exchange system(s) 132 may communicate directly with the transaction network(s) 140 to complete the transaction request, for example, with external bank accounts.

In one embodiment, the transaction request submitted by the merchant system(s) 110 may require tokenization of electronic funds. In this example, the exchange system(s) 132 may transmit a tokenization request to the tokenization system(s) 136 at step 212. The tokenization system(s) 136 may then generate tokenized funds and transmit the tokenized funds to the exchange system(s) 132 at step 214. In one embodiment, the exchange system(s) 132 may update the account information associated with the Merchants F and/or C in its database. The exchange system(s) 132 may then transmit the tokenized funds and/or the transaction confirmation message to the distributed settlement system(s) 120 at step 216. The distributed settlement system(s) 120 may store or record all transaction data associated with the transaction request and transmit the tokenized funds and/or the transaction confirmation message to the merchant system(s) 110 (e.g., Merchants C and/or F) at step 218.

Figure 3:
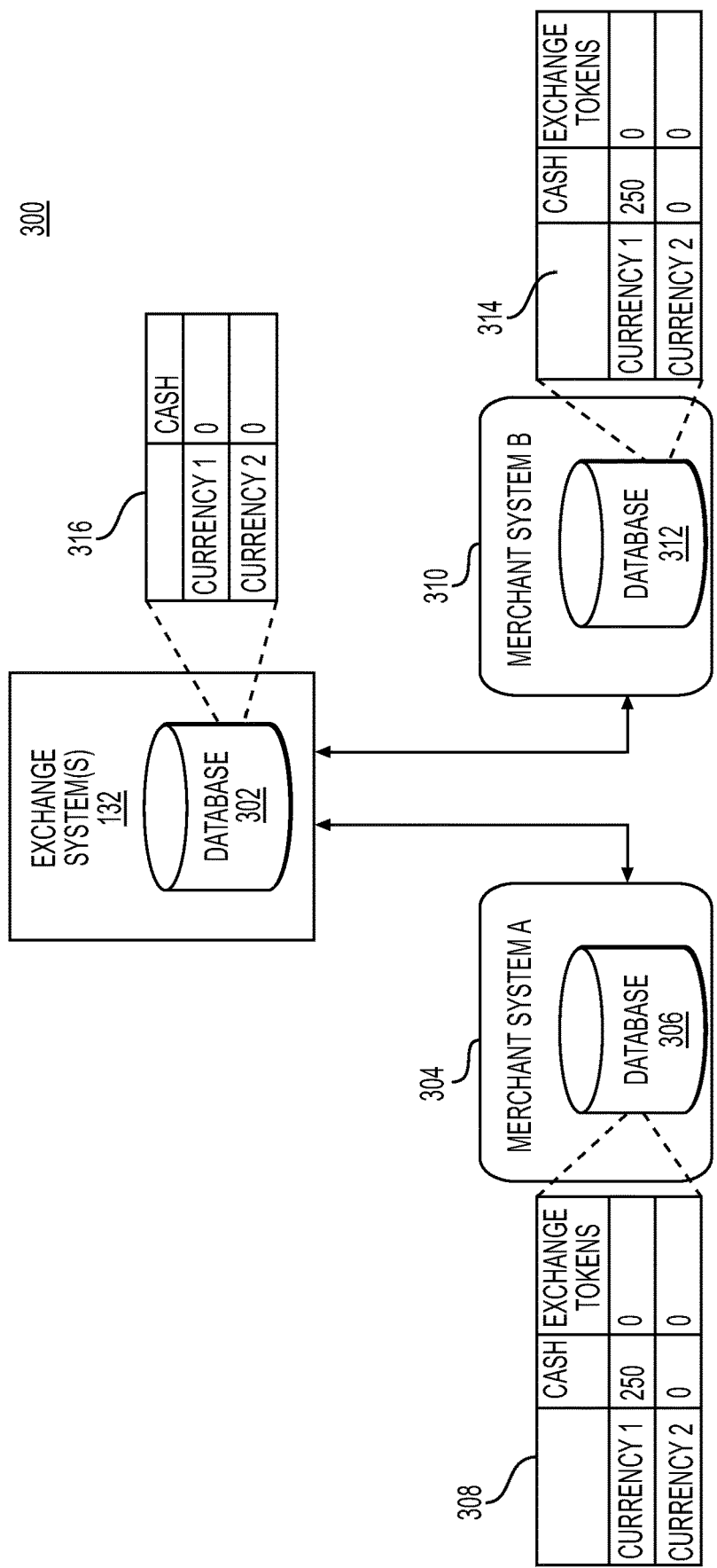
FIG. 3 depicts a block diagram of yet another exemplary electronic transaction system, according to one aspect of the present disclosure.

FIG. 3 block diagram of an exemplary system 300 showing an exemplary arrangement of one or more components of the systems 100 and 200. The system 300 includes the exchange system(s) 132, Merchant System A 304, and Merchant System B 310. The exchange system(s) 132, Merchant System A 304, and Merchant System B 312 may be in communication with each other, directly or indirectly via the systems 100 and 200, to facilitate the electronic transactions of the present disclosure. In one embodiment, the exchange system(s) 132 may comprise a database 302.

The database 302 may store, for example, account information associated with Merchant System A 304 and Merchant System B 310. Namely, the database 302 may comprise escrow balance data 316 for one or more sets of merchant accounts. In one embodiment, the exchange system(s) 132 may operate similarly to a bank. That is, the database 302 may store and maintain the escrow balance data 316 associated with Merchant System A 304 and Merchant System B 310. The escrow balance data 316 may include available balance information of one or more currencies associated with the Merchant System A 304 and Merchant System B 310. For example, any currency exchanged for tokens by the Merchant System A 304 and/or Merchant System B 312 may be held in escrow in the exchange system(s) 132. Further, the escrow balance data 316 may be updated based on the transaction requests made by Merchant System A 304 and/or Merchant System B 312.

Still referring to FIG. 3, Merchant System A 304 may comprise a database 306 that may maintain and store account balance data 308. Merchant System B 310 may also comprise a database 312 that may maintain and store account balance data 314. The account balance data 308 and 314 may include currency balance information as well as tokenized fund balance information. For example, when Merchant System A 304 exchanges a certain amount of Currency 1 (e.g., cash, fiat currency, etc.) into tokenized funds, the database 306 may update the account balance data 308 by reducing the available amount of cash for Currency 1 and add the appropriate amount of Exchange Tokens for Currency 1. Merchant System B 310 may also maintain and update the account balance data 314 similarly to Merchant System A. Further, each participant (e.g., Merchant System A 304 and Merchant System B 310) of a transaction in the exchange system(s) 132 may have at least one set of currency account to hold money which is not in tokens. That is, the exchange system(s) 132, Merchant System A 304, and Merchant System B 310 may synchronously or asynchronously monitor the transfer of funds within the systems 100, 200, and/or 300. Thus, the merchants participating in the systems 100, 200, and/or 300 may be able to avoid potential fees (e.g., scheme fees or currency exchange fees) by utilizing the distributed settlement system(s) 132 and the exchange system(s) 132, while efficiently and securely facilitating electronic transactions (e.g., make purchases or exchange or transfer funds).

In one embodiment, the processes and the methods described in FIG. 3, as well as the processes and the methods described hereafter may be executed by the systems 100, 200, and 300. The systems 100, 200, and 300 may utilizes a software development kit (SDK) server (not shown) that may provide various SDK functions (or SDK) that the merchant system(s) 120, distributed settlement system(s) 120, and the transaction processor 130 may utilize to configure their systems to facilitate communication with between each other and execute the electronic transactions of the present disclosure. Further, the systems 100, 200, and 300 may utilize an application programming interface (API) server (not shown) that may provide various APIs that the merchant system(s) 110, the distributed settlement system(s) 120, and the transaction processor 130 to facilitate communication with between each other and execute the electronic transactions of the present disclosure.

The methods described hereinafter, by utilizing the systems 100, 200, and 300 described above, solve the aforementioned technological problems arising in the conventional electronic transaction technology. That is, the systems and methods of the present disclosure described herein are directed to an improvement in the conventional electronic transaction technical field and are practically applicable in the field of executing electronic transactions utilizing distributed settlement technology.

Figure 4:
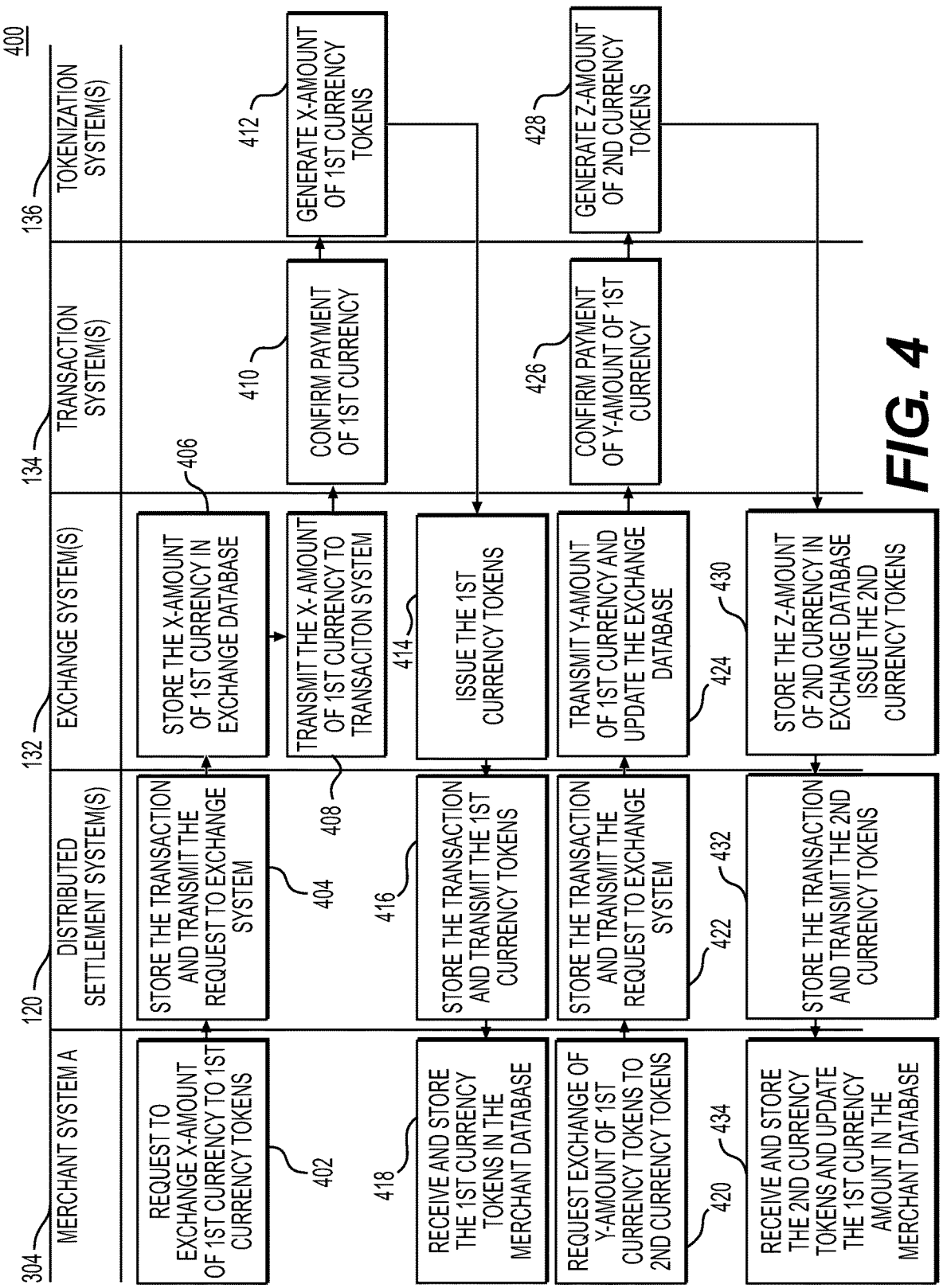
FIG. 4 depicts a flowchart of an exemplary method of executing various electronic exchange transaction, according to one aspect of the present disclosure.

FIG. 4 depicts a flowchart of an exemplary method 400 for executing various electronic transactions in accordance with of the present disclosure. Exemplary process flows of the method 400, performed in accordance with the systems 100, 200, and 300 above, are described hereinafter.

In one embodiment, at step 402, Merchant System A 304 may transmit a request to exchange an x-amount of a first currency (e.g., 100 USD) into first currency Exchange Tokens (e.g., USD Exchange Tokens) to the distributed settlement system(s) 120. At step 404, the distributed settlement system(s) 120 may store or record the data associated with the exchange request received from Merchant System A 304 in the blockchain 122 and transmit the exchange request to the exchange system(s) 132. At step 406, the exchange system(s) 132 may store or record the x-amount of the first currency (100 USD cash) in the database 302 (e.g., record 100 USD cash in the escrow balance data 316) and transmit the exchange request to the transaction system(s) 134 at step 408. At step 410, the transaction system(s) 134 may confirm the receipt of the x-amount of the first currency and transmit the exchange request to the tokenization system(s) 136. At step 412, the tokenization system(s) 136 may generate, for example, an x-amount of the first currency Exchange Tokens (e.g., 100 USD Exchange Tokens) in accordance with the x-amount of the first currency and transmit the x-amount of the first currency Exchange Tokens to the transaction system(s) 134 and/or exchange system(s) 132.

At step 414, the exchange system(s) 132 may transmit or issue the x-amount of the first currency Exchange Tokens to the distributed settlement system(s) 120. At step 416, the distributed settlement system(s) 120 may store or record the transaction data associated with the x-amount of the first currency Exchange Tokens and transmit the x-amount of the first currency Exchange Tokens to Merchant System A 304. At step 418, Merchant System A 304 may then store the x-amount of the first currency Exchange Tokens (e.g., 100 USD tokens) into the database 306 (e.g., into the account balance data 308) and reduce the total amount (e.g., 250 USD) of the first currency in the account balance data 308 by the x-amount of the first currency (e.g., 100 USD). Thus, in this exemplary scenario, the account balance data 308 of Merchant System A 304 may include 150 USD cash and 100 USD Exchange Tokens for Currency 1. Further, the escrow balance data 316 of the exchange system(s) may include 100 USD cash for Currency 1.

In another embodiment, at step 420, Merchant System A 304 may request an exchange of y-amount of the first currency Exchange Tokens (e.g., 50 USD Exchange Tokens) to a second currency Exchange Tokens (e.g., KRW Exchange Tokens). At step 422, the distributed settlement system(s) 120 may store or record the exchange request data received from Merchant System A 304 in the blockchain 122 and transmit the exchange request to the exchange system(s) 132. At step 424, the exchange system(s) 132 may reduce the x-amount of the first currency (100 USD) by the y-amount of the first currency (50 USD). The exchange system(s) 132 may then transmit the exchange request and the y-amount of the first currency (50 USD) to the transaction system(s) 134. At step 426, the transaction system(s) 134 may confirm the receipt of the y-amount of the first currency and transmit the exchange request to the tokenization system(s) 136.

At step 428, the tokenization system(s) 136 may generate a z-amount of second currency Exchange Tokens (e.g., 50000 KRW Exchange Tokens) in accordance with the y-amount of the first currency (e.g., 50 USD). For example, the z-amount of the second currency Exchange Tokens may vary based on the currency exchange rate between the first currency (e.g., USD) and the second currency (e.g., KRW). The tokenization system(s) 136 may then transmit the z-amount of the second currency Exchange Tokens (e.g., 5000 KRW Exchange Tokens) to the transaction system(s) 134 and/or exchange system(s) 132. At step 430, the exchange system(s) 132 may update and store the z-amount of the second currency (e.g., 50000 KRW cash) into the escrow balance data 316 and transmit or issue the z-amount of the second currency Exchange Tokens (e.g., 50000 KRW Exchange Tokens) to the distributed settlement system(s) 120. At step 432, the distributed settlement system(s) 120 may store and record the transaction data associated with the z-amount of the second currency Exchange Tokens and transmit the z-amount of the second currency Exchange Tokens to Merchant System A 304. At step 434, Merchant System A 304 may then store the z-amount of the second currency Exchange Tokens (e.g., 50000 KRW Exchange Tokens) into the account balance data 308 and reduce the total amount of the first currency Exchange Tokens (e.g., 100 USD Exchange Tokens) in the account balance data 308 by the y-amount of the first currency Exchange Tokens (e.g., 50 USD Exchange Tokens). Thus, in this exemplary scenario, the account balance data 308 of Merchant System A 304 may include 150 USD cash and 50 USD Exchange Tokens for Currency 1 and 50000 KRW Exchange Tokens for Currency 2. Further, the escrow balance data 316 of the exchange system(s) may include 50 USD cash for Currency 1 and 50000 KRW cash for Currency 2.

Figure 5:
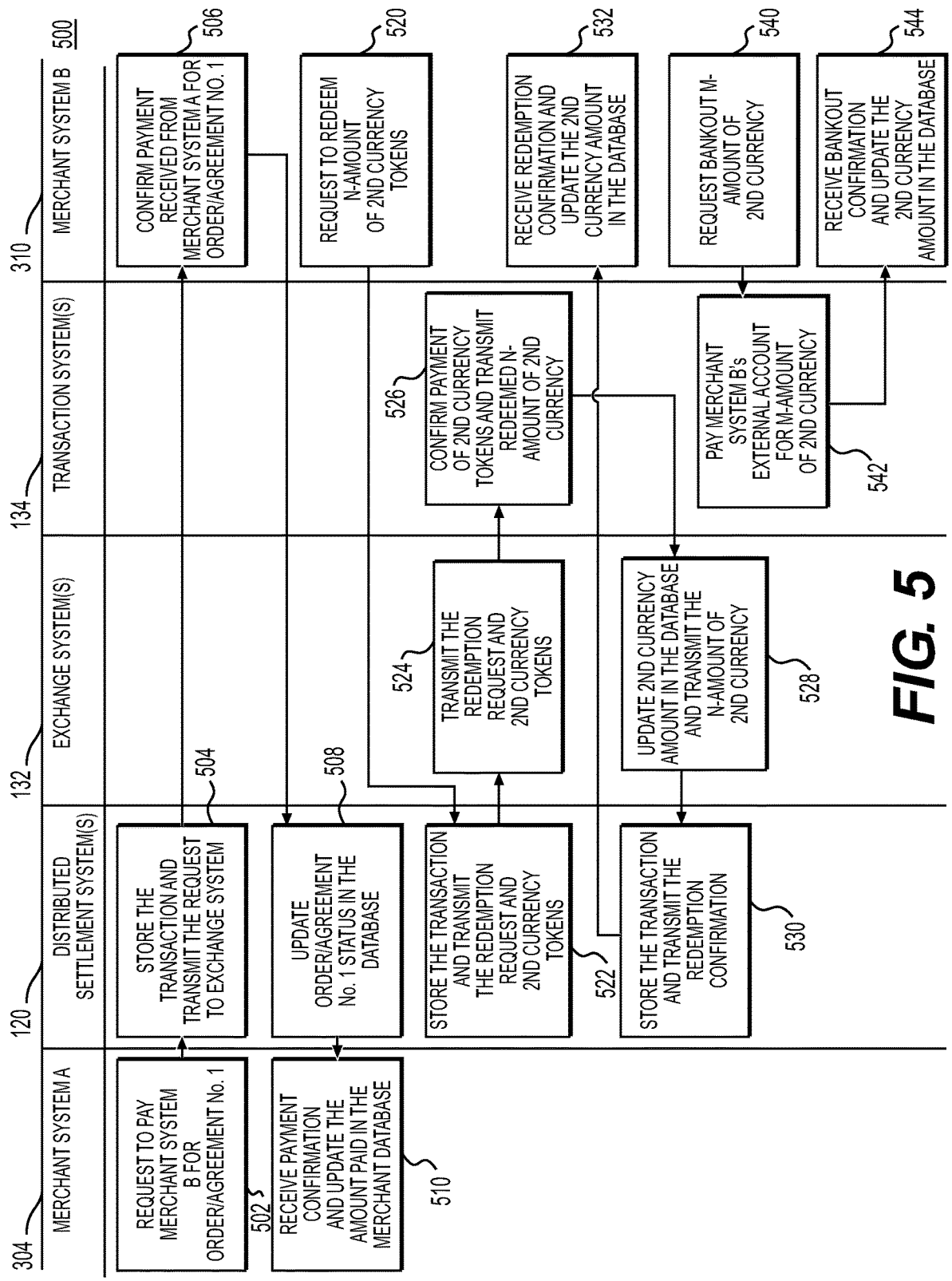
FIG. 5 depicts a flowchart of another exemplary method of executing an electronic exchange transaction, according to one aspect of the present disclosure.

FIG. 5 depicts a flowchart of another exemplary method 500 for executing various electronic transactions in accordance with of the present disclosure. Exemplary process flows of the method 500, performed in accordance with the systems 100, 200, and 300 above, are described hereinafter.

In one embodiment, at step 502, Merchant System A 304 may transmit a request to make a payment or transfer funds (e.g., 10000 KRW Exchange Tokens) to Merchant System B 310, in accordance with Order No. 1 (e.g., a purchase order, service agreement, etc.), to the distributed settlement system(s) 120. Payments may contain a reference to an order or an agreement that a party is paying for. This may prevent payment being used for multiple orders or agreements. Separating the order or agreement and the payments into different chains may prevent commercial information from being leaked to other parties. An order may include payment information, such as, payer, payee, amount owned, reference number, and/or amount paid. Further, an order or an agreement may include information for making installment payments.

At step 504, the distributed settlement system(s) 120 may store or record the payment request data in the blockchain 122 and transmit the payment or funds (e.g., 10000 KRW Exchange Tokens) in accordance with Order No. 1, via, for example, the exchange system(s) 132 and/or the transaction system(s) 134, to Merchant System B 310. In some embodiments, the distributed settlement system(s) 120 may facilitate the payment or transfer of funds to other merchant systems directly. For example, when merchant systems make payments with the tokenized funds, the distributed settlement system(s) 120 may act as an intermediary between the merchants to directly execute the payment transactions. At step 506, Merchant System B 310 may receive the payment or funds (e.g., 10000 KRW Exchange Tokens) in accordance with Order No. 1 and transmit a payment confirmation message to the distributed settlement system(s) 120. In one embodiment, Merchant System B 310 may store the payment or funds (e.g., 10000 KRW Exchange Tokens) into the account balance data 314. At step 508, the distributed settlement system(s) 120 may update the transaction data associated with Order No. 1 in the blockchain 122 in accordance with the completed payment transaction. At step 510, Merchant System A 304 may receive the payment confirmation and update the amount paid (e.g., 10000 KRW Exchange Tokens) for Order No. 1 in the database 306. For example, the Merchant System A 304 may reduce the total amount of cash or exchange tokens in accordance with the amount paid to Merchant System B 310 and update the account balance data 308. Thus, in this exemplary scenario, the account balance data 308 of Merchant System A 304 may include 150 USD cash and 50 USD Exchange Tokens for Currency 1 and 40000 KRW Exchange Tokens for Currency 2. Further, the account balance data 314 of Merchant System B 310 may include 10000 KRW Exchange Tokens for Currency 2. Furthermore, the escrow balance data 316 of the exchange system(s) may still remain as 50 USD cash for Currency 1 and 50000 KRW cash for Currency 2.

In another embodiment, at step 520, Merchant System B 310 may transmit a request to redeem an n-amount of the second currency Exchange Tokens (e.g., 5000 KRW Exchange Tokens) to the distributed settlement system(s) 120. At step 522, the distributed settlement system(s) 120 may store or record the transaction data associated with the redemption request and transmit the redemption request and the n-amount of the second currency Exchange Tokens (e.g., 5000 KRW Exchange Tokens) to the exchange system(s) 132. At step 524, the exchange system(s) 132 may transmit the redemption request and the second currency Exchange Tokens to the transaction system(s) 134. At step 526, the transaction system(s) 134 may confirm the payment of the n-amount of the second currency Exchange Tokens (e.g., 5000 KRW Exchange Tokens) and transmit n-amount of the second currency (e.g., 5000 KRW cash) in accordance with the requested redemption amount. At step 528, the exchange system(s) 132 may update the second currency amount in the escrow balance data 316 and transmit the n-amount of second currency to the distributed settlement system(s) 120. At step 530, the distribute settlement system(s) 120 may store and record the transaction data associated with the redemption request by Merchant System B 310 and transmit the redemption confirmation and the n-amount of second currency (e.g., 5000 KRW cash) to Merchant System B 310. At step 532, Merchant System B 310 may receive the redemption confirmation and update the second currency amount in the account balance data 314. Thus, in this exemplary scenario, the account balance data 314 of Merchant System B 310 may include 5000 KRW cash and 5000 KRW Exchange Tokens for Currency 2. Further, the escrow balance data 316 of the exchange system(s) 132 may be updated to include 50 USD cash for Currency 1 and 45000 KRW cash for Currency 2. Furthermore, the account balance data 308 of Merchant System A 304 may remain at 150 USD cash and 50 USD Exchange Tokens for Currency 1 and 40000 KRW Exchange Tokens for Currency 2.

In yet another embodiment, at step 540, Merchant System B 310 may transmit a request to bankout an m-amount of the second currency (e.g., 2500 KRW cash) to the transaction system(s) 134. At step 542, the transaction system(s) 134 may pay an external account (e.g., a bank account or other appropriate financial fund account) associated with Merchant System B 310 in the m-amount of the second currency (e.g., 2500 KRW). At step 544, Merchant System B 310 may receive a bankout confirmation from the transaction system(s) 134 and may update the second currency amount in the database. Thus, in this exemplary scenario, the account balance data 314 of Merchant System B 310 may include 2500 KRW cash and 5000 KRW Exchange Tokens for Currency 2. Further, the escrow balance data 316 of the exchange system(s) 132 may remain at 50 USD cash for Currency 1 and 45000 KRW cash for Currency 2. Furthermore, the account balance data 308 of Merchant System A 304 may remain at 150 USD cash and 50 USD Exchange Tokens for Currency 1 and 40000 KRW Exchange Tokens for Currency 2.

Figure 6:
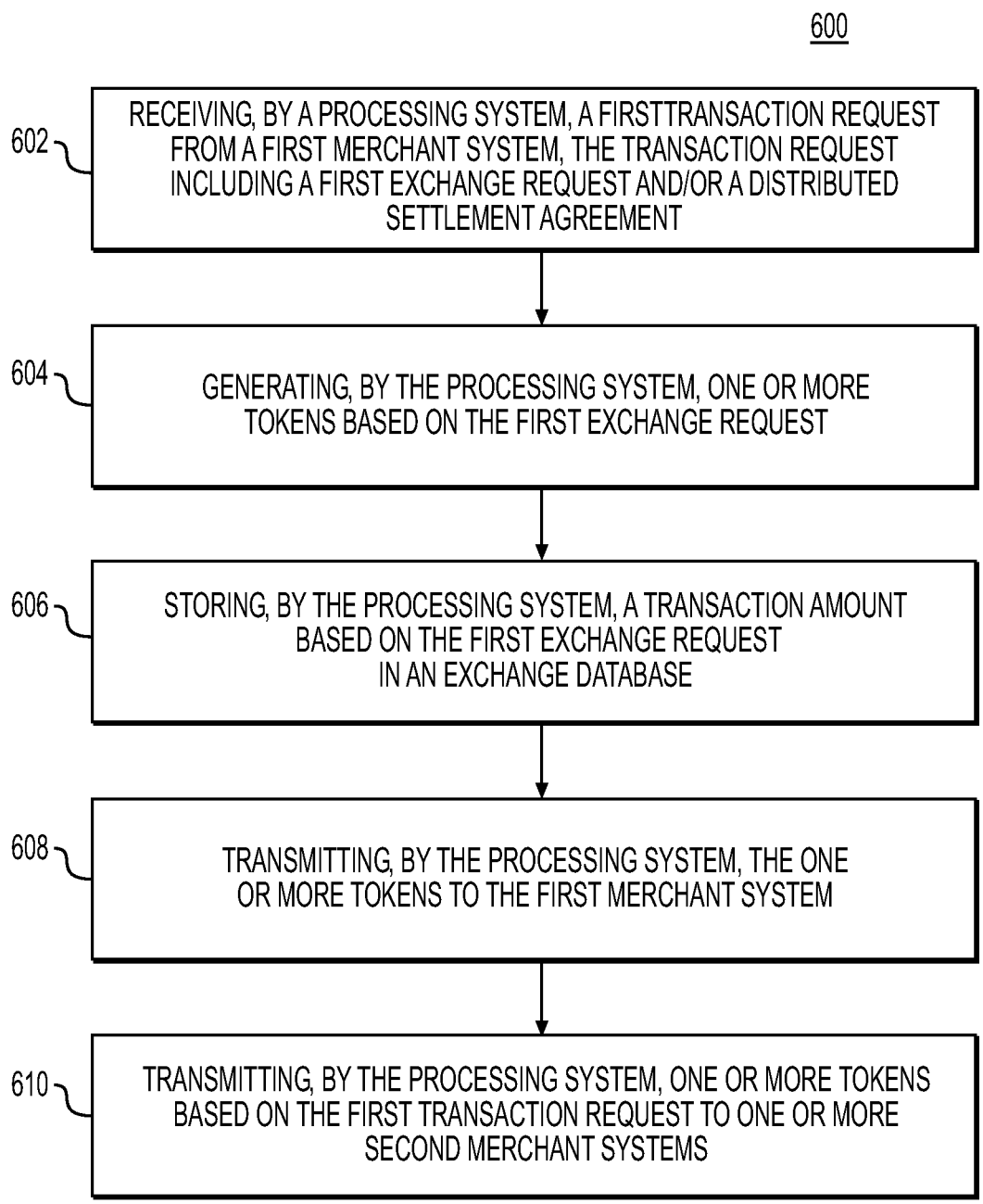
FIG. 6 illustrates a flowchart of yet another exemplary method of executing an electronic exchange transaction, according to one aspect of the present disclosure.

FIG. 6 depicts a flowchart of another exemplary method 600 for executing electronic transactions in accordance with the present disclosure. One exemplary process flow of the method 600, performed in accordance with the systems 100, 200, and 300 above, is described hereinafter.

At step 602, the exchange system(s) 132 may receive, via the distributed settlement system(s) 120, a first transaction request from a first merchant system (e.g., Merchant System A 304). The transaction request may include a first exchange request and/or a distributed settlement agreement. The first exchange request may comprise a request to exchange a first currency into one or more tokens in the first currency. In one embodiment, the distributed settlement agreement may be between the first merchant system (e.g., Merchant System A 304) and one or more second merchant systems (e.g., Merchant System B 310, etc.). The distributed settlement agreement may be stored in a point-to-point distributed or shared ledger. Further, the distributed settlement system(s) 120 may update the distributed settlement agreement based on the payment request. At step 604, the tokenization system(s) 136 may generate one or more tokens based on the first exchange request. At step 606, the exchange system(s) 132 may store a transaction amount based on the first exchange request of the first merchant system in an exchange database (e.g., the escrow balance data 316 in the database 302). At step 608, the exchange system(s) 132 may transmit the one or more tokens to the first merchant system (e.g., Merchant System A 304). At step 610, the exchange system(s) 132 and/or the distributed settlement system(s) 120 may transmit one or more tokens based on the first transaction request of Merchant System A 304 to the one or more second merchant system (e.g., Merchant System B 310, etc.). In one embodiment, the exchange system(s) 132 may receive a second exchange request from the first merchant system. The tokenization system(s) 134 may then generate one or more tokens based on the second exchange request. The second exchange request may comprise a request to exchange the one or more tokens in the first currency into one or more tokens in a second currency.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 7:
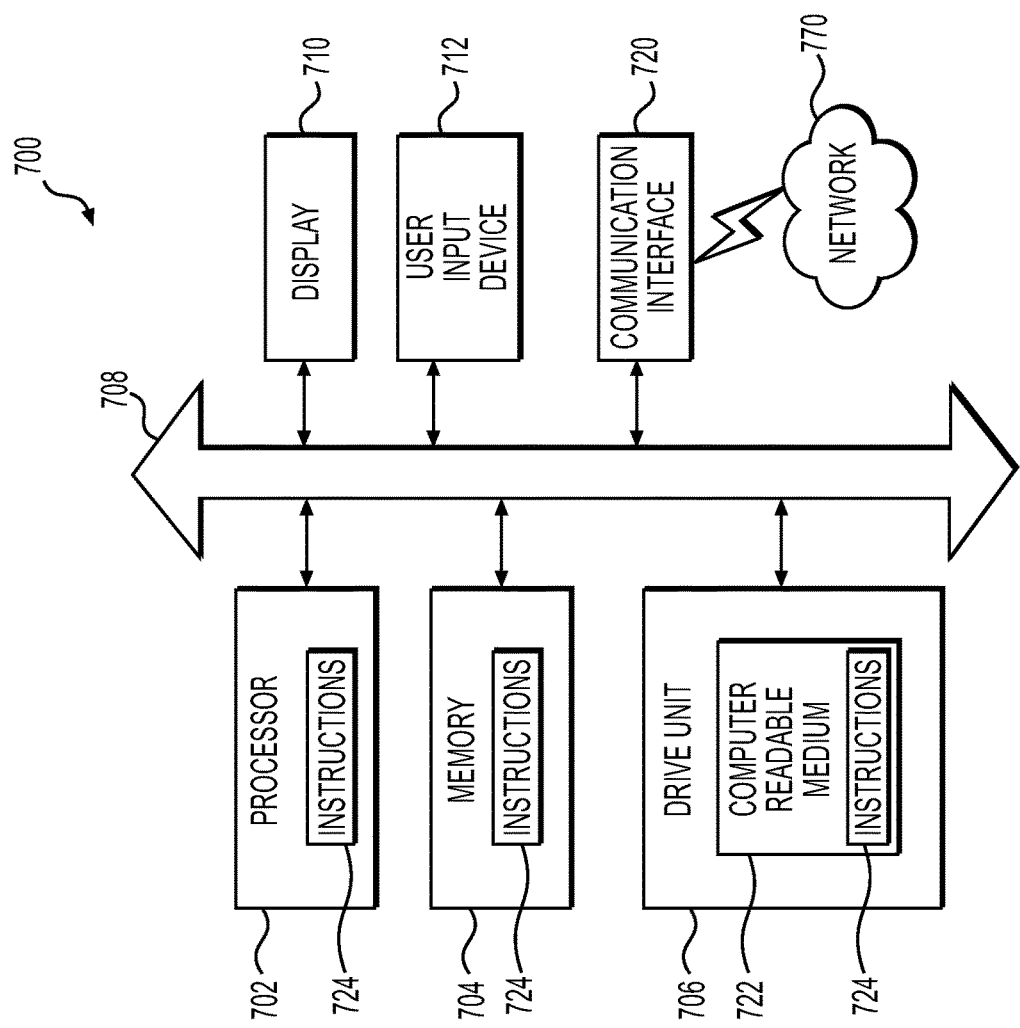
FIG. 7 illustrates a computer system for executing the techniques described herein.

FIG. 7 illustrates a computer system designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 700 may further include a display unit 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input device 712 configured to allow a user to interact with any of the components of system 700. The input device 712 may be a number pad, a keyboard, or a cursor control device, such as a mouse, or a joystick, touch screen display, remote control, or any other device operative to interact with the computer system 700.

The computer system 700 may also or alternatively include a disk or optical drive unit 706. The disk drive unit 706 may include a computer-readable medium 722 in which one or more sets of instructions 724, e.g., software, can be embedded. Further, the instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 770 can communicate voice, video, audio, images, or any other data over the network 770. Further, the instructions 724 may be transmitted or received over the network 770 via a communication port or interface 720, and/or using a bus 708. The communication port or interface 720 may be a part of the processor 702 or may be a separate component. The communication port 720 may be created in software or may be a physical connection in hardware. The communication port 720 may be configured to connect with a network 770, external media, the display 710, or any other components in system 700, or combinations thereof. The connection with the network 770 may be a physical connection, such as a wired Ethernet connection or may be established wirelessly as discussed below. Likewise, the additional connections with other components of the system 700 may be physical connections or may be established wirelessly. The network 770 may alternatively be directly connected to the bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to one or more networks 770. The network 770 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 770 may include wide area networks (WAN), such as the Internet, local area networks (LAN), campus area networks, metropolitan area networks, a direct connection such as through a Universal Serial Bus (USB) port, or any other networks that may allow for data communication. The network 770 may be configured to couple one computing device to another computing device to enable communication of data between the devices. The network 770 may generally be enabled to employ any form of machine-readable media for communicating information from one device to another. The network 770 may include communication methods by which information may travel between computing devices. The network 770 may be divided into sub-networks. The sub-networks may allow access to all of the other components connected thereto or the sub-networks may restrict access between the components. The network 770 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for executing a distributed electronic transaction by a processing system, comprising:
   receiving, by the processing system, a first transaction request from a first merchant system, wherein the transaction request includes a first exchange request and a distributed settlement agreement;
   verifying, by the processing system, account information associated with the first merchant system;
   generating, by the processing system, one or more tokens indicating values associated with the first exchange request, wherein the one or more tokens include encrypted information;

storing, by the processing system, a transaction amount based on the first exchange request in an exchange database;

transmitting, by the processing system, the one or more tokens to the first merchant system;

updating, by the processing system, the account information associated with the first merchant system based, at least in part, on synchronous monitoring of the one or more transmitted tokens;

transmitting, by the processing system, the one or more tokens based on the first transaction request to one or more second merchant systems; and updating, by the processing system, account information associated with the second merchant systems based, at least in part, on synchronous monitoring of the one or more transmitted tokens.

2. The method of claim 1, wherein the distributed settlement agreement is between the first merchant system and the one or more second merchant systems, and wherein identical copies of the distributed settlement agreement are disseminated in a peer-to-peer network.

3. The method of claim 1, wherein at least one feature of the distributed settlement agreement is verified and stored in a point-to-point distributed or shared ledger, and wherein the at least one stored feature is hashed.

4. The method of claim 1, wherein the first exchange request comprises a request to exchange a first currency into the one or more tokens in the first currency.

5. The method of claim 4, further comprising:
receiving, by the processing system, a second exchange request from the first merchant system; and
generating, by the processing system, one or more tokens based on the second exchange request.

6. The method of claim 5, wherein the second exchange request comprises a request to exchange the one or more tokens in the first currency into one or more tokens in a second currency.

7. The method of claim 1, further comprising:
updating, by the processing system, the distributed settlement agreement based on the first transaction request.

8. A system comprising:
one or more computer readable media storing instructions for executing a distributed electronic transaction; and
one or more processors configured to execute the instructions to perform operations comprising:
receiving, by a processing system, a first transaction request from a first merchant system, wherein the transaction request includes a first exchange request and a distributed settlement agreement;
verifying, by the processing system, account information associated with the first merchant system;
generating, by the processing system, one or more tokens indicating values associated with the first exchange request, wherein the one or more tokens include encrypted information;
storing, by the processing system, a transaction amount based on the first exchange request in an exchange database;
transmitting, by the processing system, the one or more tokens to the first merchant system;
updating, by the processing system, the account information associated with the first merchant system based, at least in part, on synchronous monitoring of the one or more transmitted tokens;
transmitting, by the processing system, the one or more tokens based on the first transaction request to one or more second merchant systems; and
updating, by the processing system, account information associated with the second merchant systems based, at least in part, on synchronous monitoring of the one or more transmitted tokens.

9. The system of claim 8, wherein the distributed settlement agreement is between the first merchant system and the one or more second merchant systems, and wherein identical copies of the distributed settlement agreement are disseminated in a peer-to-peer network.

10. The system of claim 8, wherein least one feature of the distributed settlement agreement is verified and stored in a point-to-point distributed or shared ledger, and wherein the at least one stored feature is hashed.

11. The system of claim 8, wherein the first exchange request comprises a request to exchange a first currency into the one or more tokens in the first currency.

12. The system of claim 11, the operations further comprising:
receiving, by the processing system, a second exchange request from the first merchant system; and
generating, by the exchange processing system, one or more tokens based on the second exchange request.

13. The system of claim 12, wherein the second exchange request comprises a request to exchange the one or more tokens in the first currency into one or more tokens in a second currency.

14. The system of claim 8, the operations further comprising:
updating, by the processing system, the distributed settlement agreement based on the first transaction request.

15. A non-transitory computer-readable medium storing instructions for executing a distributed electronic transaction, the instructions, when executed by one or more processors, causing the one or more processors to perform operations comprising:
receiving, by a processing system, a first transaction request from a first merchant system, wherein the transaction request includes a first exchange request and a distributed settlement agreement;
verifying, by the processing system, account information associated with the first merchant system;
generating, by the processing system, one or more tokens indicating values associated with the first exchange request, wherein the one or more tokens include encrypted information;
storing, by the processing system, a transaction amount based on the first exchange request in an exchange database;
transmitting, by the processing system, the one or more tokens to the first merchant system;
updating, by the processing system, the account information associated with the first merchant system based, at least in part, on synchronous monitoring of the one or more transmitted tokens;
transmitting, by the processing system, the one or more tokens based on the first transaction request to one or more second merchant systems; and
updating, by the processing system, account information associated with the second merchant systems based, at least in part, on synchronous monitoring of the one or more transmitted tokens.

16. The non-transitory computer-readable medium of claim 15, wherein identical copies of the distributed settlement agreement are disseminated in a peer-to-peer network between the first merchant system and the one or more second merchant systems, and wherein at least one feature of the distributed settlement agreement is verified and stored in a point-to-point distributed or shared ledger.

17. The non-transitory computer-readable medium of claim 15, wherein the first exchange request comprises a request to exchange a first currency into the one or more tokens in the first currency.

18. The non-transitory computer-readable medium of claim 17, the operations further comprising:
   receiving, by the processing system, a second exchange request from the first merchant system; and
   generating, by the processing system, one or more tokens based on the second exchange request.

19. The non-transitory computer-readable medium of claim 18, wherein the second exchange request comprises a request to exchange the one or more tokens in the first currency into one or more tokens in a second currency.

20. The non-transitory computer-readable medium of claim 15, the operations further comprising:
   updating, by the processing system, the distributed settlement agreement based on the first transaction request.

* * * * *

UNITED STATES PATENT AND TRADEMARK OFFICE
CERTIFICATE OF CORRECTION

PATENT NO. : 11,625,712 B2
APPLICATION NO. : 17/172501
DATED : April 11, 2023
INVENTOR(S) : Danny K. Russell and Thomas Helldorff It is certified that error appears in the above-identified patent and that said Letters Patent is hereby corrected as shown below:

In the Claims

In Column 20, Line 10, Claim 10, delete "least" and insert --at least--

Signed and Sealed this
Twenty-seventh Day of June, 2023

*Katherine Kelly Vidal*

Katherine Kelly Vidal
*Director of the United States Patent and Trademark Office*